United States Patent [19]
Kitazawa et al.

[11] Patent Number: 5,259,681
[45] Date of Patent: Nov. 9, 1993

[54] END SEPARATING DEVICE FOR SHEET HAVING A BACKING PAPER

[75] Inventors: Yasunori Kitazawa, Anjo; Hironori Harada, Chiryu; Junji Shiota, Nagoya, all of Japan

[73] Assignee: Brother Kogyo Kabushiki Kaisha, Nagoya, Japan

[21] Appl. No.: 911,116

[22] Filed: Jul. 9, 1992

[30] Foreign Application Priority Data

Aug. 2, 1991 [JP] Japan ................. 3-217836

[51] Int. Cl.⁵ ............................................. B41J 11/26
[52] U.S. Cl. .................................. 400/621; 156/247; 156/584; 225/57; 83/949
[58] Field of Search ............... 400/621, 621.1, 621.2, 400/608; 156/584, 247, 248, 250; 225/57, 24, 90, 91; 83/857, 955, 922, 945, 949

[56] References Cited

U.S. PATENT DOCUMENTS

| 3,429,761 | 2/1969 | Bleher | 156/247 |
|---|---|---|---|
| 3,530,028 | 9/1970 | Messmer | 156/584 |
| 3,985,603 | 10/1976 | Berner | 156/247 |
| 4,173,507 | 11/1979 | Tobey | 156/584 |
| 4,173,510 | 11/1979 | Tobey | 156/584 |
| 4,177,104 | 12/1979 | Parker | 156/584 |
| 4,312,597 | 1/1982 | Shimizu et al. | 400/621 |
| 4,685,991 | 8/1987 | Herrmann et al. | 156/344 |
| 4,927,278 | 5/1990 | Kuzuya et al. | 400/208 |
| 5,066,152 | 11/1991 | Kuzuya et al. | 400/621 |

FOREIGN PATENT DOCUMENTS

| 0214461 | 3/1987 | European Pat. Off. . |
|---|---|---|
| 0215397 | 3/1987 | European Pat. Off. . |
| 0506257 | 9/1992 | European Pat. Off. . |
| 0364305 | 4/1990 | Japan ............... 400/621 |
| 2008028 | 5/1979 | United Kingdom . |

*Primary Examiner*—Eugene H. Eickholt
*Attorney, Agent, or Firm*—Oliff & Berridge

[57] ABSTRACT

An end separating device for a sheet having a backing paper, which can easily separate a film of the sheet from the backing paper without requiring half cutting of the sheet. A fixing and separating member is fixed to a movable blade of a cutter for cutting a tape, and another fixing and separating member is fixed to a fixed blade of the cutter. These fixing and separating members and cooperate to bend and fix a cut end portion of the tape. Accordingly, the cut end portion of the tape is bent. After the tape is released from the fixing and separating members, a film tape is elastically returned to an original condition owing to its relatively large stiffness, but a backing paper is plastically deformed at the bent portion. As a result, the film tape can be separated from the backing paper. In other embodiments of an end separating device, a separating member is passed along end surfaces of free end portions of the sheet. The separating member bends the end surfaces to plastically deform the backing paper and enable separation of the backing paper.

14 Claims, 7 Drawing Sheets

END SEPARATING DEVICE FOR SHEET HAVING A BACKING PAPER

BACKGROUND OF THE INVENTION

1. Field of the Invention

The present invention relates to an end separating device for a sheet having a backing paper and, more particularly, to an end separating device for a sheet comprising a film and a backing paper superposed with respect to one another through an adhesive layer, wherein the backing paper is to be separated from the film at an end portion of the sheet so that the entire backing paper may be easily separated for use of the sheet.

2. Description of Related Art

Widely used in various fields is a sheet made by forming an adhesive layer on one surface of a film and attaching a backing paper to the adhesive layer. In general, such a sheet is used in such a manner that the backing paper is separated from the film at an end portion of the sheet with fingers or the like, and then, the film thus separated is to be attached to various kinds of medium. Such a sheet is disclosed in U.S. Pat. No. 4,927,278, for example.

As a measure for easily separating the backing paper from the film of such a sheet, it is known that the film only is cut at a suitable position of the sheet to effect half cutting of the sheet. In using such a half-cut sheet, the sheet is bent at the cut portion and the film is then separated from the backing paper. Such a half-cut sheet is disclosed in U.S. Pat. No. 5,066,152 (corresponding to European Patent Publication No. 0319209), for example.

However, according to the former separating method such that the backing paper is separated from the film at the end portion of the sheet with fingers or the like, it is difficult to separate the backing paper from the film with the fingers because the film and the backing paper are closely attached to each other through the adhesive layer even at the end portion of the sheet. Further, there is a possibility that the end portion of the sheet is bent in the course of repetition of a separating operation, rendering the separation of the backing paper more difficult.

On the other hand, according to the latter separating method such that the half-cut sheet is used, the film can be easily separated from the backing paper because the film only is previously cut. However, it is difficult to form a cut in the film only. Particularly when employing a thin backing paper, it is necessary to use high-precision parts in a half cutting mechanism for forming the cut in the film only, and it is also necessary to control assembly of such high-precision parts with high accuracy.

Accordingly, the use of such high-precision parts and the high-accuracy control of assembly of the parts cause an increase in cost. Further, there is a possibility that the backing paper is partially cut in spite of such high-accuracy control, with the result that the easy separation of the film from the backing paper cannot be attained.

Additionally, in the case of using the half-cut sheet mentioned above, a part of the film separated together with the backing paper is obliged to be wasted, causing an increase in running cost of the sheet.

SUMMARY OF THE PRESENT INVENTION

It is an object of the present invention to provide an end separating device for a sheet having a backing paper, which can easily separate a film of the sheet from the backing paper without requiring half cutting of the sheet.

It is another object of the present invention to provide an end separating device for a sheet having a backing paper, which can suppress the running cost of the sheet.

According to one aspect of the present invention, there is provided an end separating device for a sheet consisting of a film and a backing paper superposed on each other through an adhesive layer, the end separating device comprising a sheet fixing and separating member for bending and fixing an end portion of the sheet having a predetermined length from an end of the sheet, and for separating the film from the backing paper at the end portion of the sheet against an adhesive strength of the adhesive layer.

With this construction, the end portion of the sheet having a predetermined length from the end of the sheet is bent and fixed by the sheet fixing and separating member, so that the film of the sheet is separated from the backing paper at the end portion of the sheet against the adhesive strength of the adhesive layer.

According to another aspect of the present invention, there is provided an end separating device for a sheet consisting of a film and a backing paper superposed on each other through an adhesive layer, the end separating device comprising a sheet fixing member for fixing an end portion of the sheet with a free end portion having a predetermined length from an end of the sheet being projected from an end surface of the sheet fixing member, and a separating member adapted to act on the free end portion of the sheet for separating the film from the backing paper at the free end portion against an adhesive strength of the adhesive layer.

With this construction, the end portion of the sheet is fixed by the sheet fixing member with the free end portion having a predetermined length from the end of the sheet being projected from the end surface of the fixing member. Then, the separating member is moved to act on the free end portion of the sheet, so that the film of the sheet is separated from the backing paper at the free end portion of the sheet against the adhesive strength of the adhesive layer.

In this manner, according to the present invention, the film of the sheet can be easily separated from the backing paper at the end portion of the sheet.

Other objects and features of the invention will be more fully understood from the following detailed description and appended claims when taken with the accompanying drawings.

BRIEF DESCRIPTION OF THE DRAWINGS

The invention will be described in detail with reference to the following figures, wherein.

DESCRIPTION OF THE PREFERRED EMBODIMENTS

There will now be described some preferred embodiments according to the present invention with reference to the drawings.

FIGS. 1 to 5 illustrate a first preferred embodiment according to the present invention applied to a tape printing device for making a printed tape T.

Figure 1:
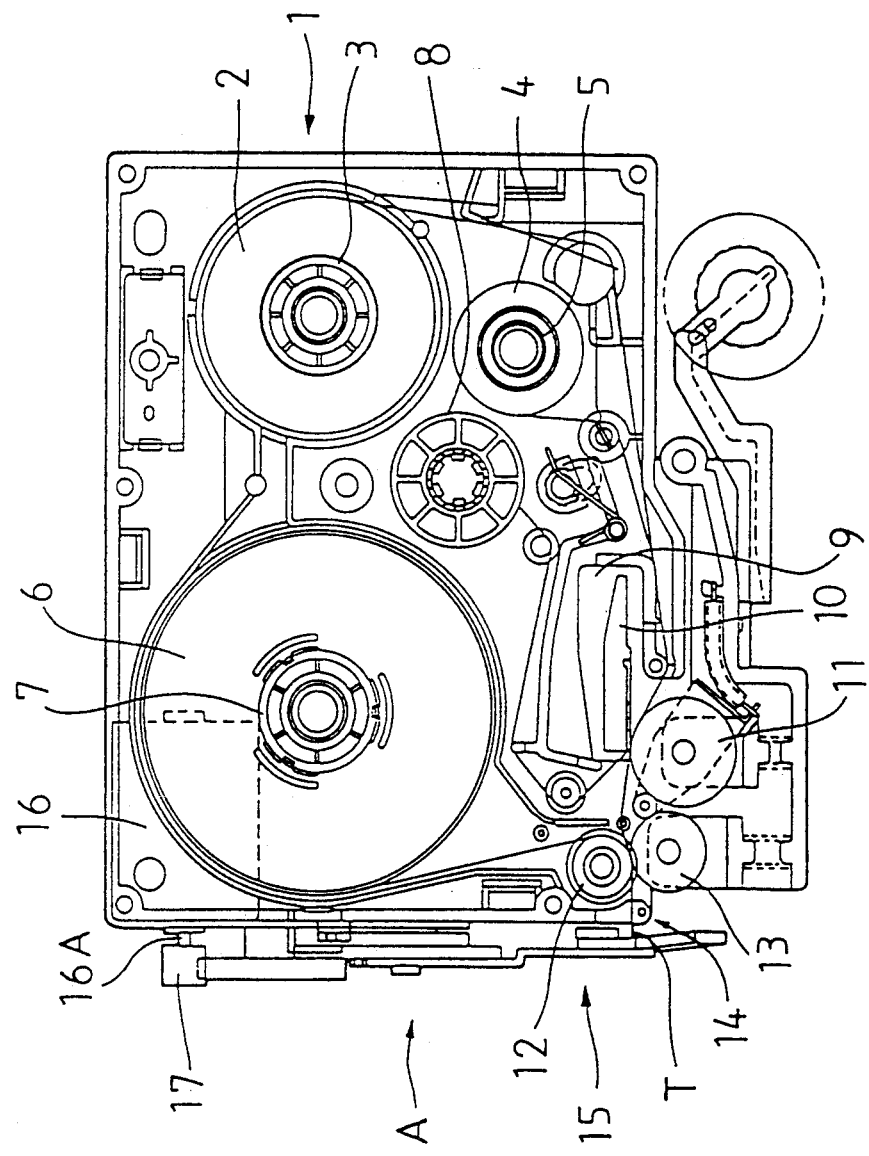
FIG. 1 is a plan view of a tape cassette applied to a tape printing device with an upper case of the tape cassette removed, in a first preferred embodiment according to the present invention.

Referring first to FIG. 1 which is a plan view of a tape cassette 1 arranged in connection with the tape printing device (an upper case of the tape cassette 1 being removed), the tape cassette 1 includes a tape spool 3 around which a transparent film tape 2 is wound, a ribbon spool 5 around which a thermal ink ribbon 4 is wound, and an adhesive tape spool 7 around which a double-sided adhesive tape 6 having a separable backing paper E is wound with the backing paper E forming an outer surface of the roll of the adhesive tape 6. These spools 3, 5 and 7 are rotatably supported within the tape cassette 1 in cooperation with respective supporting portions provided on a lower surface of the upper case (not shown).

Similarly, a ribbon take-up spool 8 is rotatably supported within the tape cassette 1 at a position among the spools 3, 5 and 7. The ribbon take-up spool 8 rotates with a ribbon take-up shaft (not shown), so that the thermal ink ribbon 4 used for printing is taken up around the ribbon take-up spool 8 by driving the ribbon take-up shaft.

The tape cassette 1 is formed with a recess 9, and a thermal head 10 is located in the recess 9. A platen roller 11 is located to face the thermal head 10 in pressure contact, so that printing of characters or the like is effected on the film tape 2 through the thermal ink ribbon 4 by the cooperation of the thermal head 10 and the platen roller 11.

A pressure roller 12 and a tape feed roller 13 are rotatably supported in pressure contact with each other on the downstream side of the thermal head 10 along an advancing direction of the film tape 2 (i.e., at a left lower position as viewed in FIG. 1).

The pressure roller 12 and the tape feed roller 13 function to feed the film tape 2, on which characters or the like have been printed through the thermal ink ribbon 4 by the thermal head 10, together with the double-sided adhesive tape 6 having the backing paper E, and bring both the tapes 2 and 6 into adhesion to each other in such a manner that a printed surface of the film tape 2 adheres to an adhesive surface of the adhesive tape 6 on the side opposite to the backing paper E. As a result, the printed tape T is finally ejected from a tape ejecting portion 14.

Figure 5:
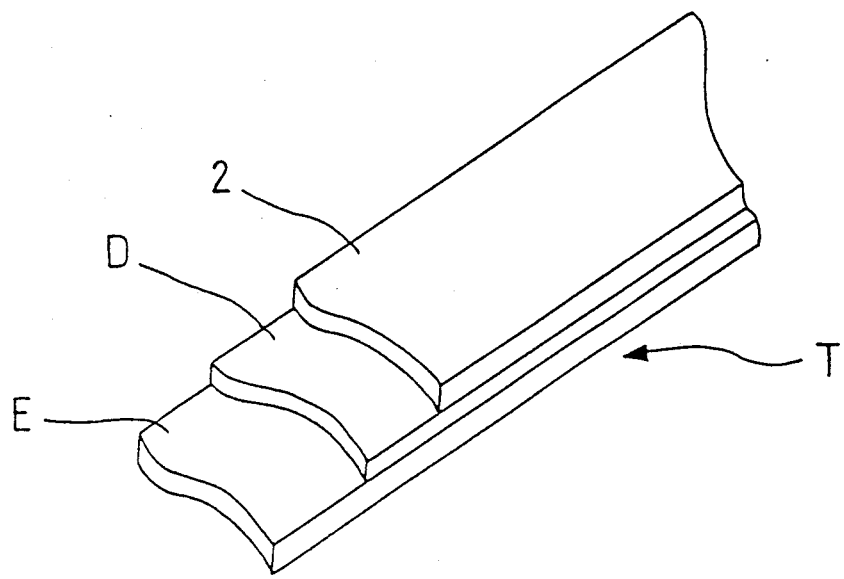
FIG. 5 is a perspective view illustrating a structure of the tape.

Referring to FIG. 5, the printed tape T thus prepared has a multilayer structure such that the printed film tape 2 and the backing paper E are separably bonded together through an adhesive layer D.

A cutter mechanism 15 is provided in the vicinity of the tape ejecting portion 14, so as to suitably cut the tape T ejected from the tape ejecting portion 14.

Figure 2:
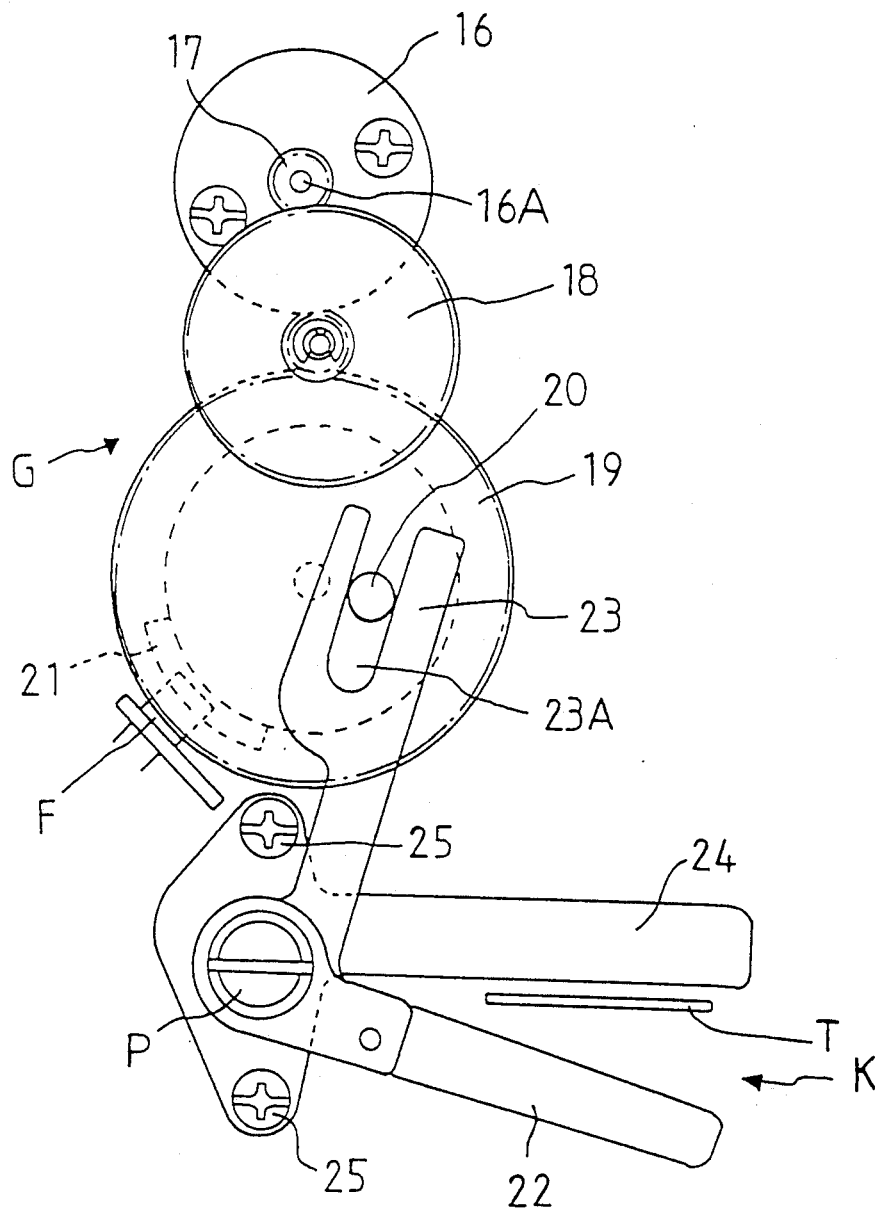
FIG. 2 is a side view of a cutter mechanism mounted to the tape cassette shown in FIG. 1.

The cutter mechanism 15 will now be described with reference to FIG. 2. FIG. 2 is a side view of the cutter mechanism 15 taken in the direction of an arrow A shown in FIG. 1.

Referring to FIG. 2, a DC motor 16 is provided below a rear left portion of the tape cassette 1 as viewed in FIG. 1. A pinion 17 is fixed to a drive shaft 16A of the DC motor 16. An idle gear 18 is meshed with the pinion 17, and a rocking gear 19 is meshed with the idle gear 18. The pinion 17, the idle gear 18 and the rocking gear 19 constitute a gearing mechanism G. The idle gear 18 and the rocking gear 19 are rotatably supported on a side wall of the tape cassette 1.

A rocking pin 20 is fixed to the rocking gear 19 at a position near the center of rotation thereof, and a sensor plate 21 is provided in the vicinity of a gear teeth portion of the rocking gear 19. A cutter sensor F is located outside the gear teeth portion of the rocking gear 19. The sensor plate 21 is detected by the cutter sensor F, thereby detecting a rotational position of the rocking gear 19 to control a drive starting position of a movable blade 22.

The movable blade 22 is rotatably supported on a rotating shaft P. A rocking lever 23 is fixed to the movable blade 22 at the rotating shaft P. The rocking lever 23 is provided with a recess 23A, and the rocking pin 20 is inserted in the recess 23A. With this arrangement, when the DC motor 16 is rotated in a forward or reverse direction, the pinion 17, the idle gear 18 and the rocking gear 19 are respectively rotated in the forward or reverse direction. As a result, the rocking lever 23 is rocked through the rocking pin 20, thereby rotating the movable blade 22 about the axis of the rotating shaft P. A fixed blade 24 is fixed to the side wall of the tape cassette 1 by means of screws 25. The movable blade 22 is adapted to be opened or closed relative to the fixed blade 24 with the rotating shaft P operating as a fulcrum. Thus, the movable blade 22 and the fixed blade 24 constitute a cutter K for cutting the tape T ejected from the tape ejecting portion 14. A fully open angle of the movable blade 22 relative to the fixed blade 24 is set to about 30 degrees in this preferred embodiment.

Figure 3:
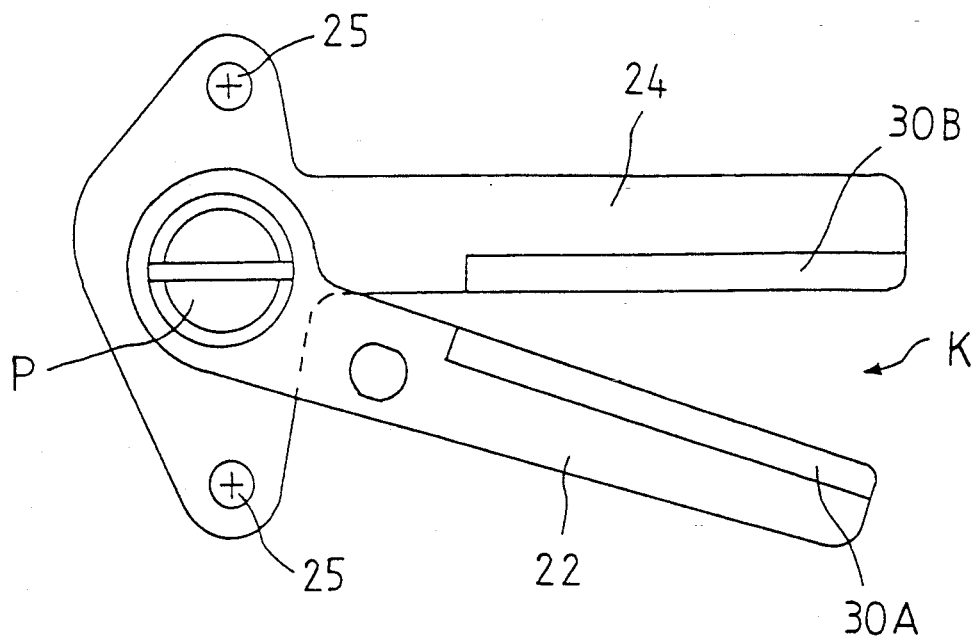
FIG. 3 is an enlarged side view of a cutter constituting the cutter mechanism shown in FIG. 2.
Figure 4:
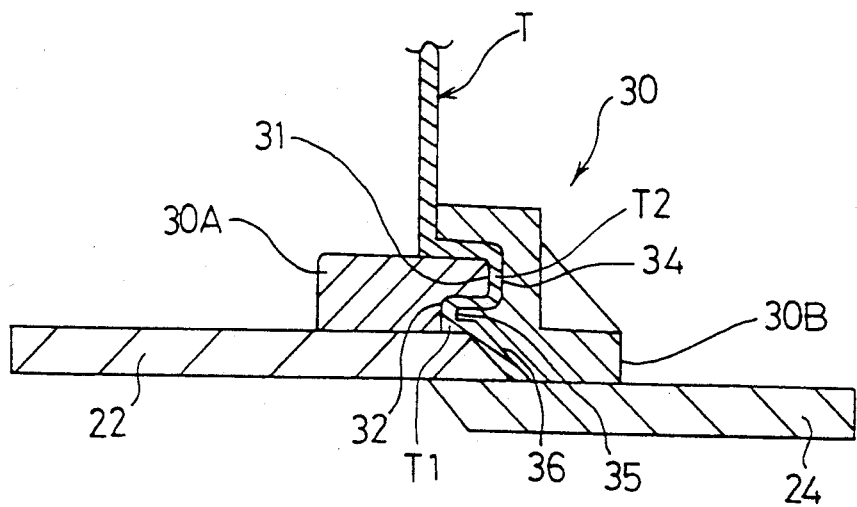
FIG. 4 is a schematic sectional view of a fixing and separating mechanism fixed to the cutter, illustrating a condition where a tape cut by the cutter is bent and fixed by the fixing and separating mechanism.

Referring next to FIGS. 3 and 4, reference numeral 30 designates a tape fixing and separating mechanism provided on the cutter K comprised of the movable blade 22 and the fixed blade 24. FIG. 3 is an enlarged side view of the cutter K, and FIG. 4 is a schematic sectional view illustrating a condition where the tape T is cut by the cutter K.

The tape fixing and separating mechanism 30 is comprised of two fixing and separating members 30A and 30B. The first fixing and separating member 30A is fixed to an outer side surface of the movable blade 22 along a cutting edge thereof, while the second fixing and separating member 30B is fixed to an outer side surface of the fixed blade 24 along a cutting edge thereof. These fixing and separating members 30A and 30B cooperate to bend a cut end portion of the tape T by a given length several times and fix the cut end portion of the tape T in such a bent condition.

As shown in FIG. 4, the first fixing and separating member 30A is provided with a rightward projecting portion 31 and a leftward recessed portion 32 contiguous to each other. The projecting portion 31 and the recessed portion 32 have edges curved with a predetermined curvature so that when the tape T is fixed, it may be prevented from being unduly bent to be deformed or broken.

On the other hand, the second fixing and separating member 30B is disposed in opposed relationship to the first fixing and separating member 30A so that a predetermined gap corresponding to a thickness of the tape T may be defined between the first and second fixing and separating members 30A and 30B when the tape T is fixed. That is, the second fixing and separating member 30B is provided with a recessed portion 34 mating with the projecting portion 31, a projecting portion 35 mating with the recessed portion 32, and a tapering portion 36 mating with the tapering cutting edge of the movable blade 22. The recessed portion 34 and the projecting portion 35 have edges curved for the same reason as that mentioned above.

The fully open angle of the movable blade 22 relative to the fixed blade 24 is set to about 30 degrees as mentioned above. In other words, the movable blade 22 is movable relative to the fixed blade 24 in the angular range of 0 to 30 degrees in association with the opening or closing operation. Accordingly, the first fixing and separating member 30A fixed to the movable blade 22 is also movable relative to the second fixing and separating member 30B fixed to the fixed blade 24 in the angular range of 0 to 30 degrees.

Now, there will be described the operation of the fixing and separating mechanism 30 for fixing the cut end portion of the tape T and separating the film tape 2 from the backing paper E at the cut end portion of the tape T.

After the printed tape T is prepared by the tape printing device, the DC motor 16 is driven to operate the cutter mechanism 15 in such a manner as mentioned above. Accordingly, the movable blade 22 is rotated toward the fixed blade 24. At the same time, the first fixing and separating member 30A is moved toward the second fixing and separating member 30B, and they cooperate to bend and fix the tape T. In this condition, the movable blade 22 and the fixed blade 24 cooperate to start cutting the tape T.

When the movable blade 22 is further rotated to completely cut the tape T, the cut end portion of the tape T is fixed by the projecting portion 31 and the recessed portion 32 of the first fixing and separating member 30A and the recessed portion 34 and the projecting portion 35 of the second fixing and separating member 30B. In this fixed condition, the backing paper E of the tape T is plastically deformed at a portion T1 between the tapering portion 36 and a bent portion formed by the recessed portion 32 and the projecting portion 35.

Such plastic deformation of the backing paper E is due to the fact that while the film tape 2 is strong in stiffness and can elastically restore an original condition from a bent condition, the backing paper E is weak in stiffness as compared with the film tape 2 and therefore tends to be plastically deformed at the portion T1. Accordingly, at the portion T1 of the tape T, the film tape 2 tends to be separated from the backing paper E against an adhesive strength of the adhesive layer D, starting from the cut end of the tape T. Further, at a portion T2 of the tape T fixed by the projecting portion 31 of the first fixing and separating member 30A and the recessed portion 34 of the second fixing and separating member 30B, the tape T is pressed by the projecting portion 31 from the film tape 2 side. Accordingly, at the portion T2 of the tape T, no plastic deformation of the backing paper E is generated owing to the elastic stiffness of the film tape 2 and the adhesive strength of the adhesive layer D present on upper and lower sides of the projecting portion 31 as viewed in FIG. 4.

In this manner, the backing paper E is plastically deformed at the cut end portion of the tape T. Accordingly, when the tape T is released from the fixing and separating members 30A and 30B, the film tape 2 is separated from the backing paper E at the cut end portion of the tape T.

As described above, according to the first preferred embodiment, the fixing and separating members 30A and 30B comprising the tape end separating device are fixed to the movable blade 22 and the fixed blade 24, respectively. Therefore, simultaneously with cutting of the tape T by means of the movable blade 22 and the fixed blade 24, the film tape 2 can be separated from the backing paper E at the cut end portion of the tape T. Accordingly, the tape end separating device can be manufactured with the reduced number of component parts at a low cost. Further, it is very convenient that the film tape 2 can be separated from the backing paper E at the cut end portion of the tape T every time the tape T is cut.

Thus, in the tape T prepared above, the film tape 2 can be easily separated from the backing paper E.

Although the fixing and separating members 30A and 30B are provided on the outer side surfaces of the movable blade 22 and the fixed blade 24, respectively, in respect of an ejecting direction of the tape T to be ejected from the tape ejecting portion 14 in the above preferred embodiment, it is to be noted that this arrangement is merely illustrative and not limitative. For instance, the fixing and separating members 30A and 30B may be provided on the inner side surfaces of the movable blade 22 and the fixed blade 24, respectively.

Figure 6:
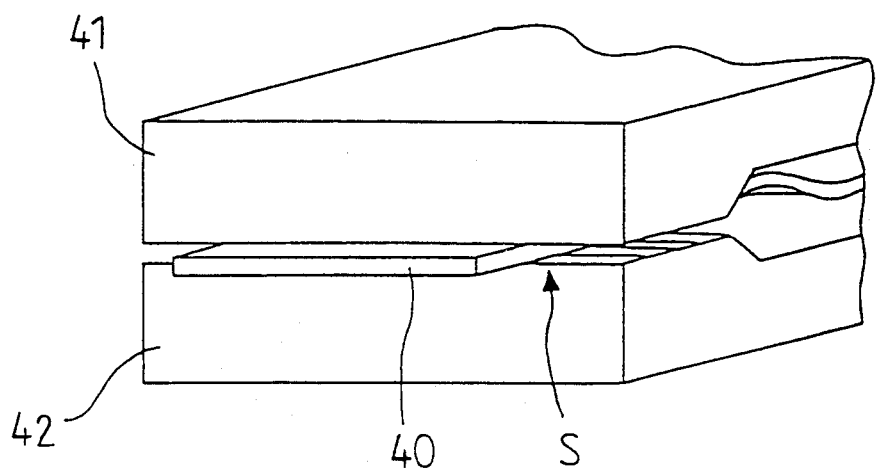
FIG. 6 is a perspective view of a fixing member in a second preferred embodiment according to the present invention, illustrating a condition where a sheet is fixed by the fixing member.

Now, a second preferred embodiment according to the present invention will be described with reference to FIGS. 6 to 9. FIG. 6 is a perspective view illustrating a condition where a sheet S having the backing paper E is fixed by a pair of sheet fixing members 41 and 42. As shown in FIG. 6, an end portion of the sheet S is fixedly sandwiched between the sheet fixing members 41 and 42 with a free end portion 40 having a predetermined length being projected from end surfaces of the sheet fixing members 41 and 42. The sheet S has a multilayer structure similar to that of the tape T shown in FIG. 5.

The length of the free end portion 40 is set to about 1 mm in this preferred embodiment.

In FIGS. 6 to 9, there is only illustrated the concept of a mechanism for separating the film tape 2 from the backing paper E at a cut end portion of the sheet S cut by a conventional cutting mechanism.

Figure 8:
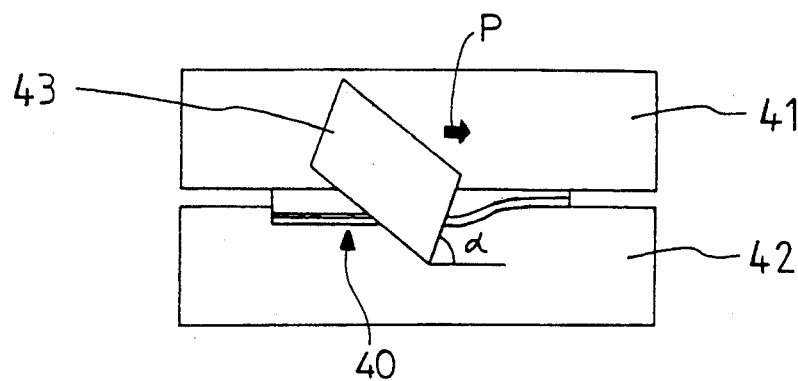
FIG. 8 is an elevational view of a separating member in the second preferred embodiment, illustrating a condition where the separating member is moved to act on a free end portion of the sheet.

Referring to FIG. 8, a separating member 43 is provided in such a manner that an angle α of the separating member 43 relative to the free end portion 40 is set to about 80 degrees. The separating member 43 is adapted to be moved in the direction of an arrow P in FIG. 8 by a suitable driving mechanism as maintaining the angle α at about 80 degrees.

Figure 7:
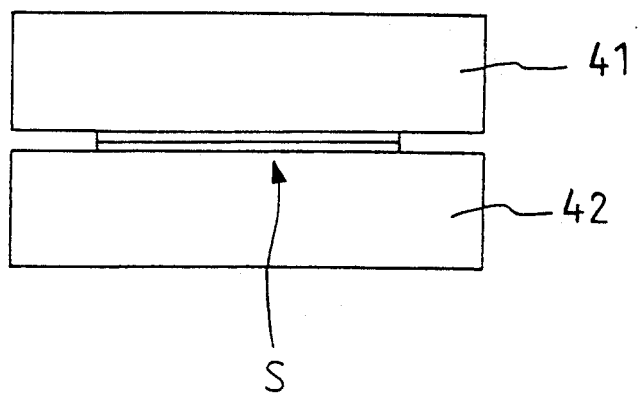
FIG. 7 is an elevational view of FIG. 6.
Figure 9:
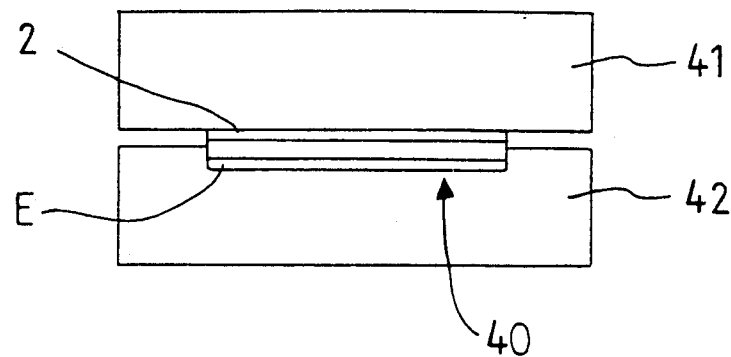
FIG. 9 is an elevational view illustrating a condition where a film of the sheet has been separated from a backing paper by the separating member in the second preferred embodiment.

The operation of the second preferred embodiment will now be described. First, the sheet S is fixed by the sheet fixing members 41 and 42 with the free end portion 40 being projected from the end surfaces of the fixing members 41 and 42 as shown in FIG. 7. Then, the separating member 43 is moved along the end surfaces of the fixing members 41 and 42 in the direction of the arrow P as maintaining the angle α to act on the free end portion 40 of the sheet S as shown in FIG. 8. As a result, the free end portion 40 of the sheet S is bent along the end surfaces of the sheet fixing members 41 and 42. Accordingly, the backing paper E only is plastically deformed at such a bent portion for the same reason as that mentioned in the first preferred embodiment. Resultantly, the film tape 2 is separated from the backing paper E at the free end portion 40 of the sheet S as shown in FIG. 9 by the operation similar to that of the first preferred embodiment.

In this manner, in the second preferred embodiment, the end portion of the sheet S is fixed by the fixing members 41 and 42 with the free end portion 40 being projected from the end surfaces of the fixing members 41 and 42. In this fixed condition, the separating member 43 is moved as maintaining the angle α at about 80 degrees to act on the free end portion 40 of the sheet S. Accordingly, the film tape 2 can be separated from the backing paper E surely and smoothly.

Although the angle α of the separating member 43 relative to the free end portion 40 is set to about 80 degrees in the second preferred embodiment, it is to be noted that this value is merely illustrative and not limitative. That is, the value of the angle α may be suitably changed according to the stiffness of the film tape 2 and the backing paper E, the adhesive strength of the adhesive layer D, etc.

Figure 10:
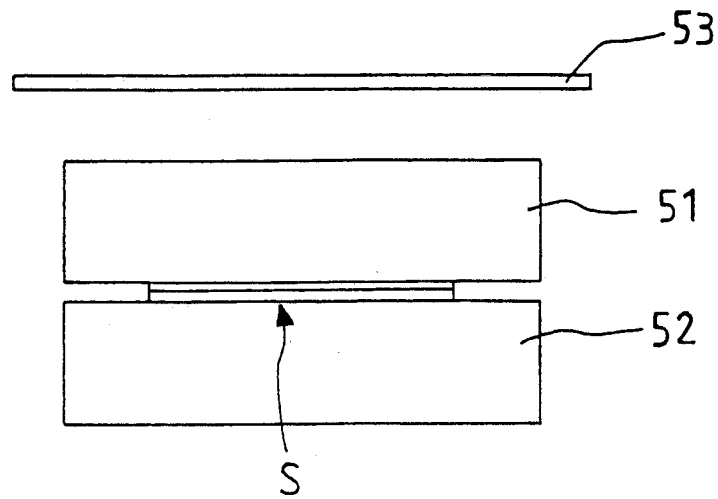
FIG. 10 is an elevational view of a fixing member in a third preferred embodiment according to the present invention, illustrating a condition where a sheet is fixed by the fixing member.
Figure 11:
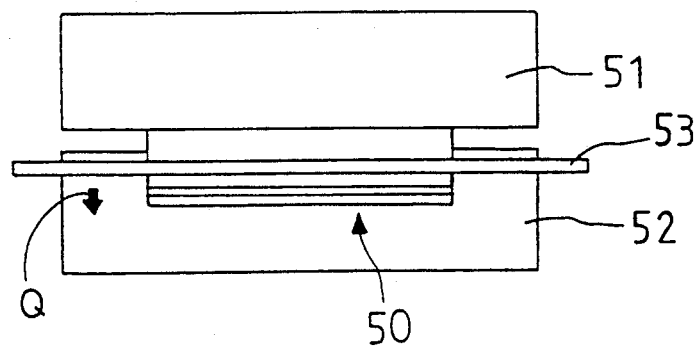
FIG. 11 is an elevational view of a separating member in the third preferred embodiment, illustrating a condition where the separating member is moved to act on a free end portion of the sheet.
Figure 12:
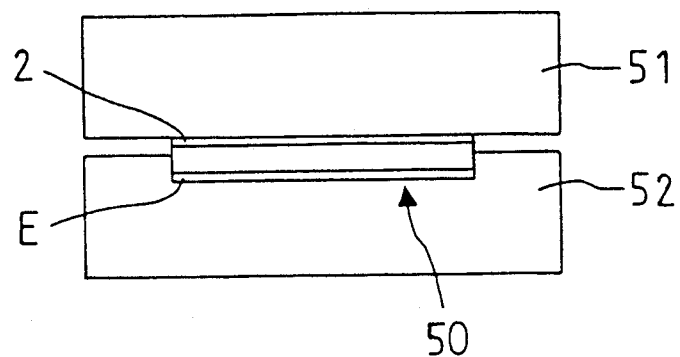
FIG. 12 is an elevational view illustrating a condition where a film of the sheet has been separated from a backing paper by the separating member in the third preferred embodiment.

Finally, a third preferred embodiment according to the present invention will be described with reference to FIGS. 10 to 12. In the third preferred embodiment, the same sheet S as that used in the second preferred embodiment is fixed by a pair of fixing members 51 and 52 with a free end portion 50 of the sheet S being projected from end surfaces of the fixing members 51 and 52. A separating member 53 is provided so as to be movable vertically relative to the free end portion 50 by means of a suitable driving mechanism.

Like the second preferred embodiment, there is only illustrated the concept of a mechanism for separating the film tape 2 from the backing paper E at a cut end portion of the sheet S cut by a conventional cutting mechanism.

The separating mechanism in the third preferred embodiment is operated in the following manner. First, the sheet S is fixed by the fixing members 51 and 52 with the free end portion 50 being projected from the end surfaces of the fixing members 51 and 52 as shown in FIG. 10. Then, the separating member 53 is moved vertically (in the direction of an arrow Q in FIG. 11) along the end surfaces of the fixing members 51 and 52 to act on the free end portion 50 of the sheet S as shown in FIG. 11. As a result, the free end portion 50 is bent along the end surfaces of the fixing members 51 and 52 as shown in FIG. 12. Accordingly, the backing paper E only is plastically deformed at such a bent portion for the same reason as that mentioned in the first preferred embodiment, and resultantly, the film tape 2 is separated from the backing paper E at the free end portion 50 of the sheet S as shown in FIG. 12 by the operation similar to that of the second preferred embodiment.

Also in the third preferred embodiment similar to the second preferred embodiment, the film tape 2 can be separated from the backing paper E at the free end portion 50 of the sheet S surely and smoothly.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An end separating device for a sheet comprising a film and a backing member superposed on each other through an adhesive layer, said end separating device comprising:
   a sheet fixing and bending member for bending and fixing an end portion of the sheet having a predetermined length from an end edge of the sheet, said sheet fixing and bending member separating the film from the backing member at the end portion of the sheet against an adhesive strength of the adhesive layer, said sheet fixing and bending member comprising a projecting portion and a recessed portion for receiving the projecting portion; and
   a cutting member for cutting the sheet to form the end edge of the sheet, said cutting member comprising two blades, the projecting portion being disposed on one of the two blades and the recessed portion being disposed on the other of the two blades, wherein at least one of the two blades is rotatably disposed to cut the sheet.

2. The end separating device according to claim 1, wherein said blades are movable with respect to one another in an angular range of substantially 0 to 30 degrees.

3. A tape printing device for making a printed tape, comprising:
   tape preparation means for preparing a multi-layered printed tape, said printed tape comprising a superimposed film tape and backing layer, an adhesive layer adhering said film tape and said backing layer to one another; and
   an end separating device for separating an end of said printed tape prepared by said taper preparation means, said end separating device comprising a tape fixing and bending member for fixing and bending an end portion of said printed tape having a predetermined length from an end edge of said printed tape, said tape fixing and bending member separating the film tape from the backing layer at the end portion of the printed tape against an adhesive strength of the adhesive layer, wherein said end separating device includes a gearing mechanism and a cutter mechanism, said cutter mechanism including a cutter sensor and a cutter member, said cutter sensor controlling a position of said cutter member according to a position of said gearing mechanism.

4. The tape printing device according to claim 3, wherein said cutter member comprises two blades, one of said blades being a fixed blade and the other of said blades being a movable blade, said movable blade being rotatably supported on a rotating shaft.

5. The tape printing device according to claim 4, wherein said blades are movable with respect to one another in an angular range of substantially 0 to 30 degrees.

6. The printing device according to claim 10, wherein said movable blade and said fixed blade each have a side surface, a first fixing and separating member being fixed to said side surface of said movable blade along a cutting edge of said movable blade and a second fixing and separating member being fixed to said side surface of said fixed blade along a cutting edge of said fixed blade, said first and second fixing and separating members cooperating to bend and fix said end portion of said printed tape.

7. The tape printing device according to claim 6, wherein said first fixing and separating member has contiguous projection and recessed portions, said projecting portion and said recessed portion having curved edges of a predetermined curvature.

8. The tape printing device according to claim 7, wherein said second fixing and separating member has projecting and recessed portions which mate with the projecting and recessed portions of said first fixing and separating member, said projecting portion and said recessed portion of said second fixing and separating member having curved edges of a predetermined curvature, said second fixing and separating member being disposed in opposed relationship to said first fixing and separating member.

9. The tape printing device according to claim 8, wherein said first and second fixing and separating members define a predetermined gap therebetween, said gap corresponding to a thickness of the printed tape.

10. The tape printing device according to claim 4, wherein said movable blade has a tapered cutting edge, said second fixing and separating member having a tapering portion which mates with said tapered cutting edge.

11. The tape printing device according to claim 3, wherein said end separating device includes a pair of sheet fixing members for sandwiching therebetween said end portion of said printed tape, said sheet fixing members each having end surfaces, said predetermined length of said printed tape projecting from said end surfaces of said sheet fixing members.

12. The tape printing device according to claim 11, wherein a separating member moves along said end surfaces of said sheet fixing members to bend said end portion of said printed tape, said separating member being positioned such that a predetermined angle of the separating member relative to said end portion of said printed tape is provided.

13. The tape device according to claim 12, wherein said predetermined angle is substantially 80 degrees.

14. The tape printing device according to claim 11, wherein a separating member moves vertically along said end surfaces of said sheet fixing member to bend said end portion of said printed tape.

* * * * *